(12) United States Patent
Baynham (10) Patent No.: US 6,198,922 B1
(45) Date of Patent: Mar. 6, 2001

(54) METHOD AND SYSTEM FOR LOCATING SUBSCRIBERS IN A GLOBAL TELECOMMUNICATIONS NETWORK

(75) Inventor: Gordon Paul Baynham, Washington, DC (US)

(73) Assignee: Iridium IP LLC, Restin, VA (US)

( * ) Notice: Subject to any disclaimer, the term of this patent is extended or adjusted under 35 U.S.C. 154(b) by 0 days.

(21) Appl. No.: 09/160,208

(22) Filed: Sep. 22, 1998

(51) Int. Cl.$^7$ ........................................ H04Q 7/36
(52) U.S. Cl. .................. 455/429; 455/427; 455/440; 455/446; 455/447; 455/445; 455/456; 455/449; 455/444
(58) Field of Search ..................... 455/435, 432, 455/440, 441, 446, 447, 445, 456, 12.1, 449, 444, 427, 429; 370/316

(56) References Cited

U.S. PATENT DOCUMENTS 5,561,836 * 10/1996 Sowles et al. ................... 455/12.1
5,809,422 *  9/1998 Raleigh et al. ................... 455/449
6,067,445 *  5/2000 Gray et al. ....................... 445/446

* cited by examiner

*Primary Examiner*—Fan Tsang
*Assistant Examiner*—Keith Ferguson
(74) *Attorney, Agent, or Firm*—Sawyer Law Group LLP (57) ABSTRACT

A system and method for managing an interaction with a user of a telecommunications network is disclosed. The telecommunications network utilizes data relating to a geometry of the network. The method and system include identifying a plurality of geographic regions and correlating the geometry with plurality of geographic regions. Therefore, data relating to the plurality of geographic regions can be used by the telecommunications network.

4 Claims, 9 Drawing Sheets

METHOD AND SYSTEM FOR LOCATING SUBSCRIBERS IN A GLOBAL TELECOMMUNICATIONS NETWORK

FIELD OF THE INVENTION

The present invention relates to telecommunications networks and more particularly to a method and system for locating subscribers in a global telecommunications network.

BACKGROUND OF THE INVENTION

With the development of a global economy, business people who regularly travel internationally are a fast growing breed. To meet their needs, satellite-based global telecommunications networks are being developed. The first such network is to be commercially activated by Iridium, LLC on Nov. 1, 1998. These networks provide services, such as international cellular phone and paging services. Such networks inevitably involve numerous entities in many different countries which work together as part of the network. Such entities involve governments, service providers, industry clearinghouses, and others. Each call made through the network often involves numerous entities and often crosses national sovereignty lines.

When providing global telecommunication services to users, national sovereignty lines and other geographic or geopolitical characteristics may be taken into account. For example, rates for telephone service to certain countries may be higher. Similarly, service to certain countries may be blocked because of laws within a particular country. Geographic characteristics, such as mountain ranges, may also be taken into account to ensure adequate signal transmission.

Conventional cellular systems utilize terrestrial cellular sites. Each site is located in a particular geographic area. The conventional site is also immovable. Thus, the geographic area of a cell site is known. However, one of ordinary skill in the art will readily realize that such immovable cell sites must be used in the conventional cellular system. Conventional satellites may also be able to identify geographic features. For example, a conventional satellite can broadcast a beam to the earth and, using portions of the beam reflected back to the conventional satellite, determine the features of a geographic area of interest. However, one of ordinary skill in the art will realize that such conventional satellites merely identify features of the area intercepting the broadcast beam.

Accordingly, what is needed is a system and method for providing global telecommunications while taking geopolitical and other geographic features into account. The present invention addresses such a need.

SUMMARY OF THE INVENTION

The present invention provides a method and system for managing an interaction with a user of a telecommunications network. The telecommunications network utilizes data relating to a geometry of the network. The method and system comprise identifying a plurality of geographic regions and correlating the geometry with plurality of geographic regions. Thus, data relating to the geographic regions can be used in the telecommunications network.

According to the system and method disclosed herein, the present invention allows terrestrial geographic regions to be correlated with geometry data utilized by the network providing telecommunication services, thereby increasing overall system performance.

DETAILED DESCRIPTION OF THE INVENTION

The present invention relates to an improvement in managing interactions with users of a telecommunications network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To understand the method and system in accordance with the present invention, first the preferred embodiment of the telecommunications network which may use the present invention is described.

Figure 1:
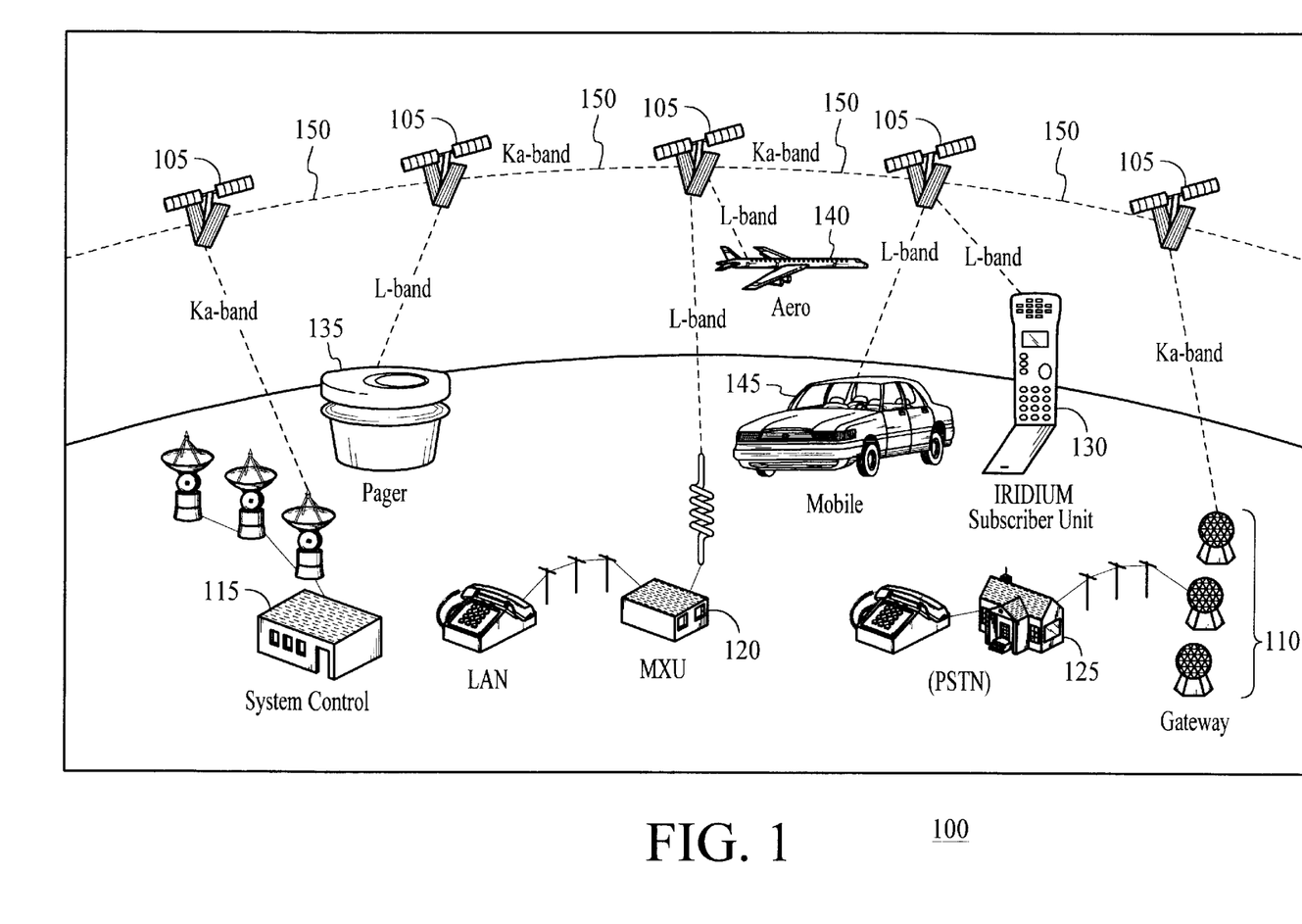
FIG. 1 illustrates a global telecommunications network which may use the present invention.

FIG. 1 illustrates a telecommunications network which may be used with the present invention. The network 100 includes low earth orbiting satellites 105, gateways 110, system control 115, and Mobile Exchange Units 120 (MXU). System Control 115 serves as the central management component for the network 100. Gateways 110 interconnect the satellite constellation 105 with public switched telephone networks 125 (PSTN), making communication possible between network cellular phones 130 and any other telephone in the world. The MXU 120 provide access to the network 100 at remote locations. Telecommunications services may also be provided to pagers 135, aircraft 140, and automobiles 145.

Figure 2:
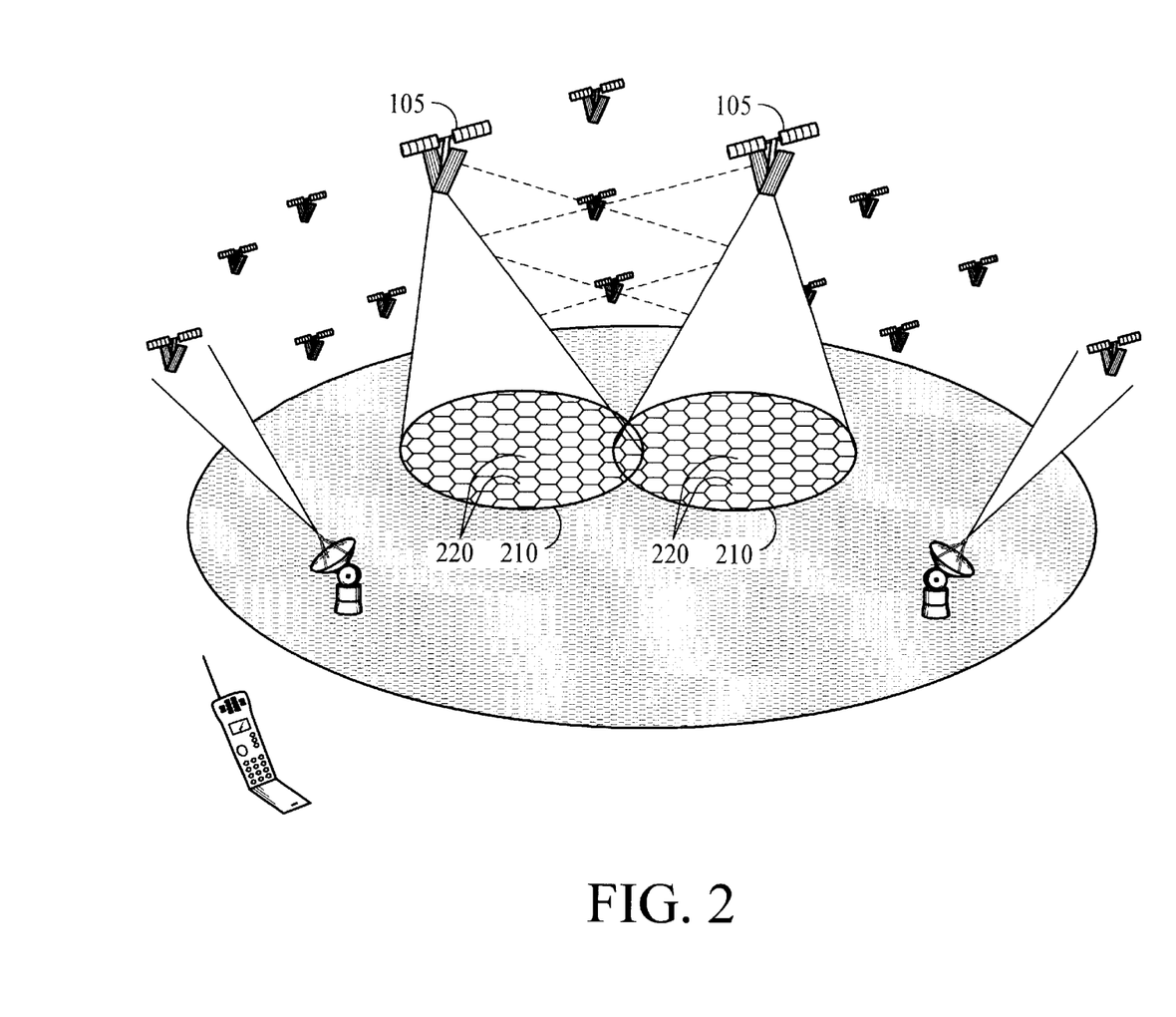
FIG. 2 illustrates satellite footprints of the global telecommunications network of FIG. 1.

The satellites 105 of the network 100 employ intersatellite links 150, or "crosslinks", to communicate directly with each other. These crosslinks 150 provide reliable, high-speed communications between neighboring satellites, allowing call routing and administration to occur efficiently. As illustrated in FIG. 2, each satellite 105 in the constellation has a ground coverage area called a "footprint" 210. The footprint 210 is further divided into smaller areas called "cells" 220. The footprints 210 of the satellites are overlapped to provide maximum coverage.

For a preferred embodiment of the call processing architecture of the network 100, the globe is divided into Location Area Codes (LACs). Each LAC is a service location for the network 100. Each gateway 110 services a certain set of LACs. For example, when a user makes a call from his/her cellular phone 130 to a particular location, the cellular phone 130 first links with a satellite 150 which has a cell servicing his/her current LAC. The cellular phone 130 requests a satellite channel for the call. The request is sent to the gateway 110 which services the caller's LAC. This gateway 110 then initiates the opening of a channel between phone 130 and the satellite 110. Once the channel is established, the signal for the phone call is routed through the crosslinks 150 of the satellites 105 to the gateway 110 servicing the LAC of the call's destination. This gateway 110 then sends the call to the PSTN 125 which routes the signal to the particular phone called.

Figure 3:
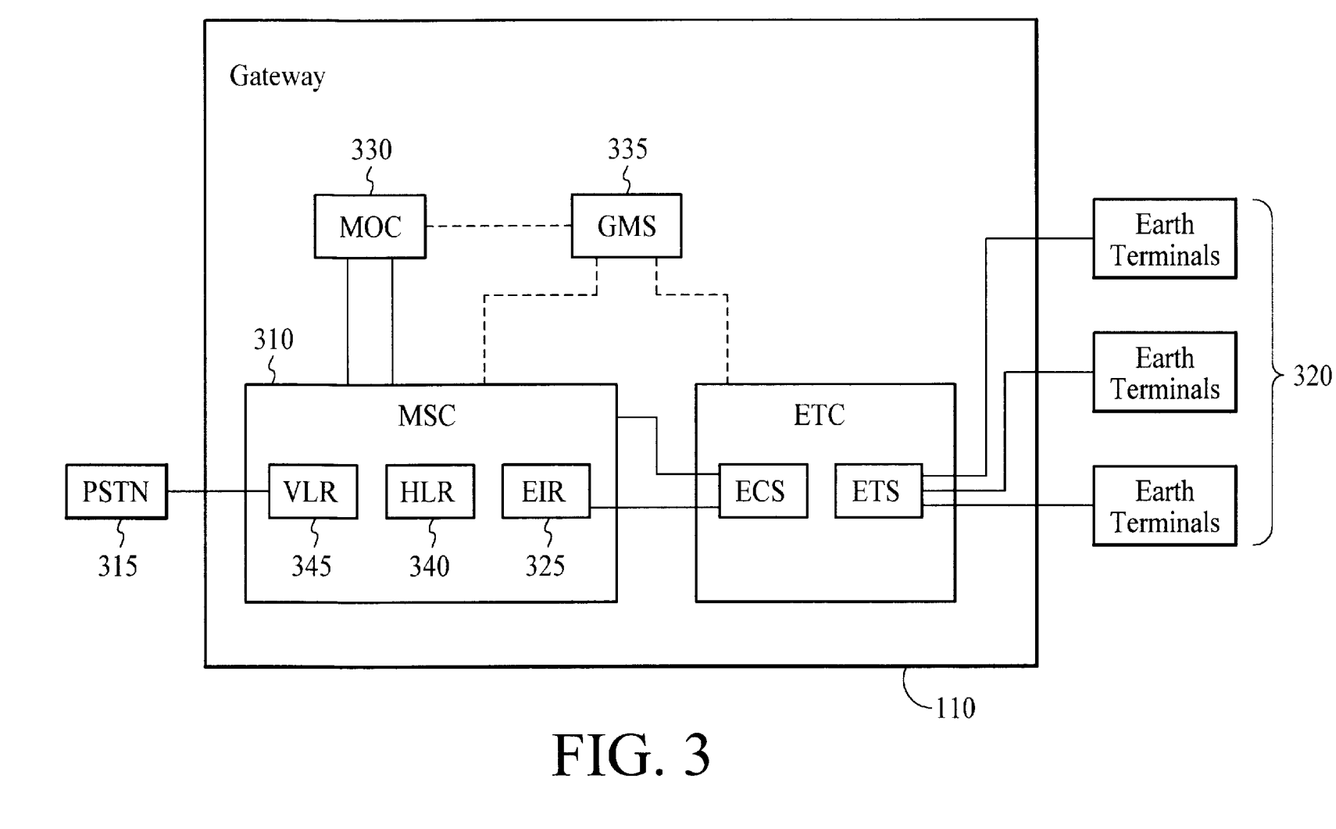
FIG. 3 illustrates a gateway of the global telecommunications network of FIG. 1.

FIG. 3 illustrates in more detail a preferred embodiment of the gateway 110 of the network 100. The heart of the gateway 110 is the Mobile Switching Center 310 (MSC) or the "switch". An example of a switch 310 which may be used is the Siemens GSM-D900 switch. The switch 310 has two "sides": a land side which connects to the local telephone network via the PSTN 315, and a mobile side which connects to Earth Terminal Controllers 320 which communicate with the satellite constellation 105 using K-band radio links. Information for the physical subscriber equipment (cellular phone 130, pager 135, etc.) is kept in the Equipment Identification Register 325 (EIR). The gateway's 110 Message Origination Controller 330 (MOC) supports a variety of messaging services such as direct messaging to pagers. The Gateway Management System 335 (GMS) provides operations, administration, and maintenance support for each of the gateway subsystems.

In addition to the EIR 325, the switch 330 includes a Home Location Register 340 (HLR) and a Visited Location Register 345 (VLR). The HLR 340 stores subscriber service information for the "Home Gateway". A Home Gateway is assigned to each subscriber to the network 100 and is related to the LAC at which the subscriber is based. The Home Gateway is responsible for granting network access. Whenever a subscriber places or receives a call, the network 100 will determine the subscriber's location with accuracy sufficient for call control. The Home Gateway will receive and evaluate this location information to determine whether it is permissible for the call to proceed. This feature is essential to help ensure compliance with calling restriction laws in nations where such laws exist.

The Home Gateway is also responsible for the assignment of a Visited Gateway as part of the network access process. Subscriber location information is used to index into a map of the world kept at the Home Gateway. This determines a LAC for the visited location which in turn will be used to identify a Visited Gateway which will serve and control the mobile subscriber end of a call.

The Visited Gateway temporarily retains a copy of select subscriber information in its VLR 345. This information remains within the Visited Gateway until the subscriber "roams" into a new Visited Gateway territory or until it expires. When a subscriber is at "Home", the Visited Gateway and the Home Gateway are one and the same.

Figure 4:
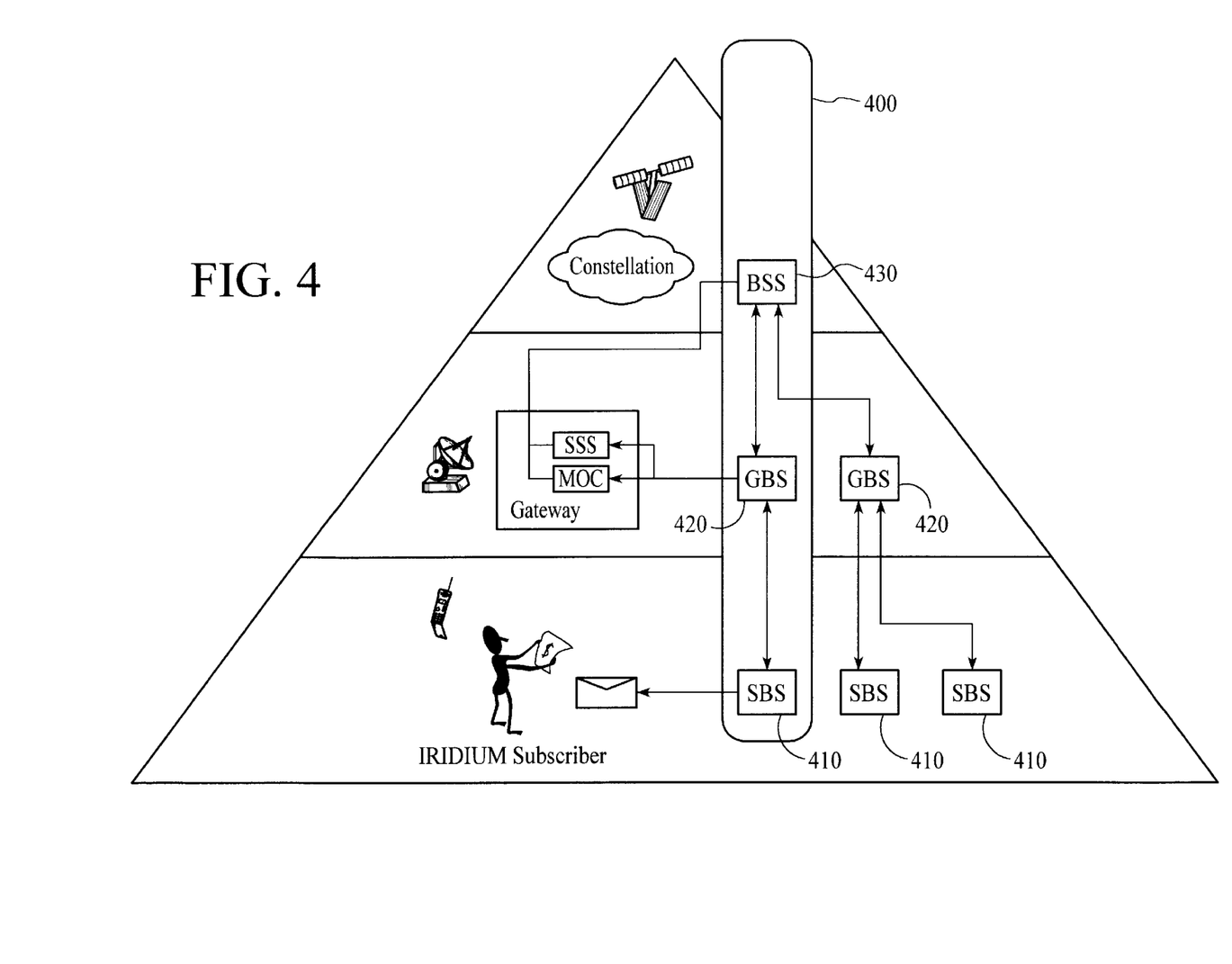
FIG. 4 illustrates a business system for managing the telecommunications network of FIG. 1.

To manage usage information of the network 100, a business system 400 is used. FIG. 4 illustrates a preferred embodiment of a business system 400 which may be used with the present invention. The business system 400 comprises three subsystems: the Service Business System 410 (SBS), the Gateway Business System 420 (GBS), and the Business Support System 430 (BSS).

The SBS 410 includes service providers who sell subscriptions for usage of the telecommunications network 100 directly to the consumer and roaming partners who resells usage of the network 100 and also provide other cellular services in their own systems. SBS 410 functions include pre-sales support, service negotiation, general and billing inquiries, payment remittance, pricing and invoicing, receivables management, and account profile maintenance. The functioning of the SBS 410 will be described in more detail later.

The GBS 420 includes gateways 110 (FIG. 1) of the telecommunications network 100 and their operators. The functions of the GBS 420 includes service activation, Tier II customer support, payment and settlement processing, service provider management, usage collection, and retail rating. These functions are performed in the gateways 110. The functioning of the GBS 420 will be described in more detail later.

The functions of the BSS 430 includes gateway relationship management, financial and treasury management, and usage collection. They also include usage verification, revenue distribution, settlement statement generation, and payable/receivable processing. These functions are managed by a Clearinghouse and occur in the satellites 105.

To more particularly describe the processes of the BSS 430, please refer to FIGS. 5 and 6 in conjunction with the discussion below.

Figure 5:
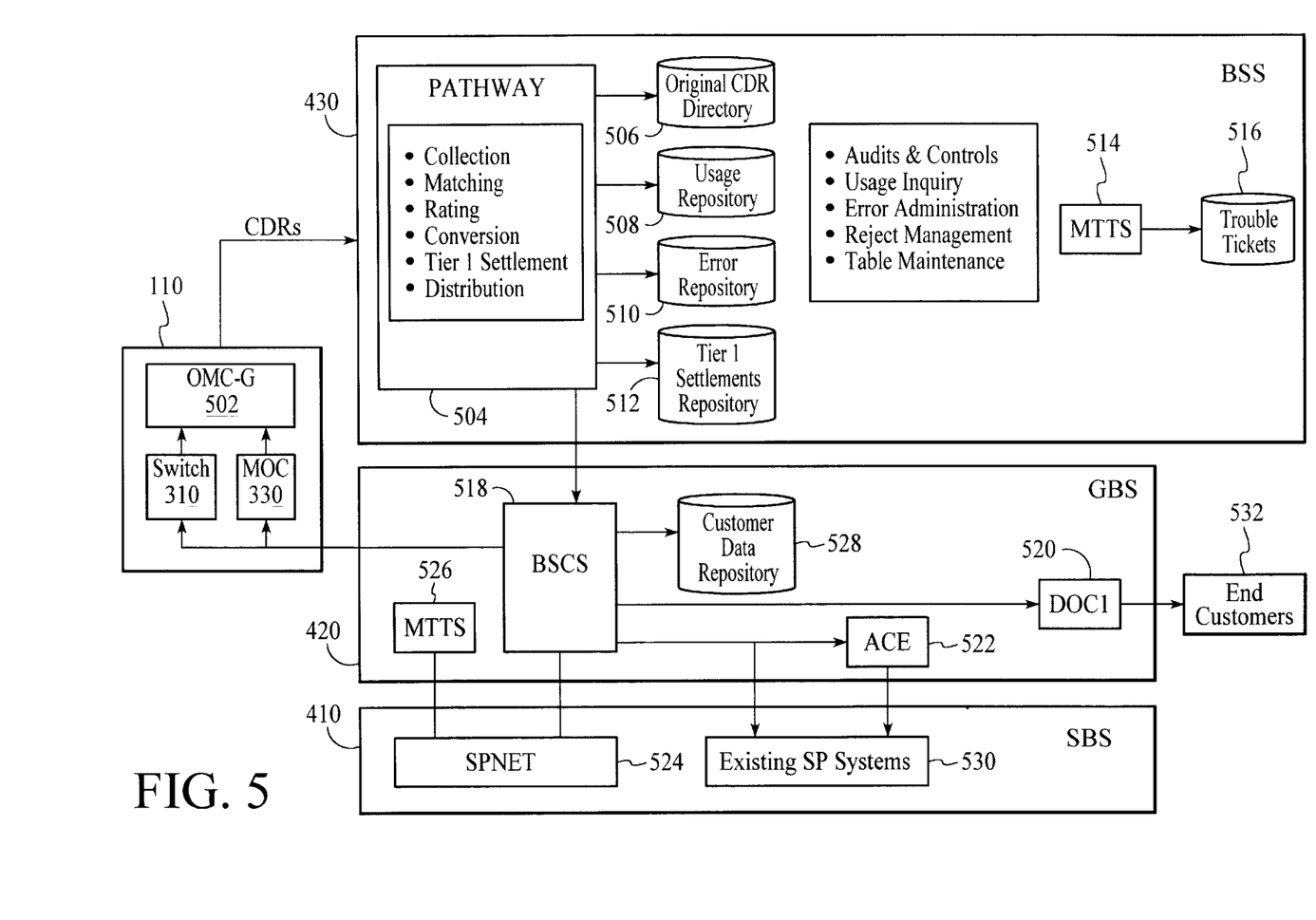
FIG. 5 illustrates in more detail the business system of FIG. 4.
Figure 6:
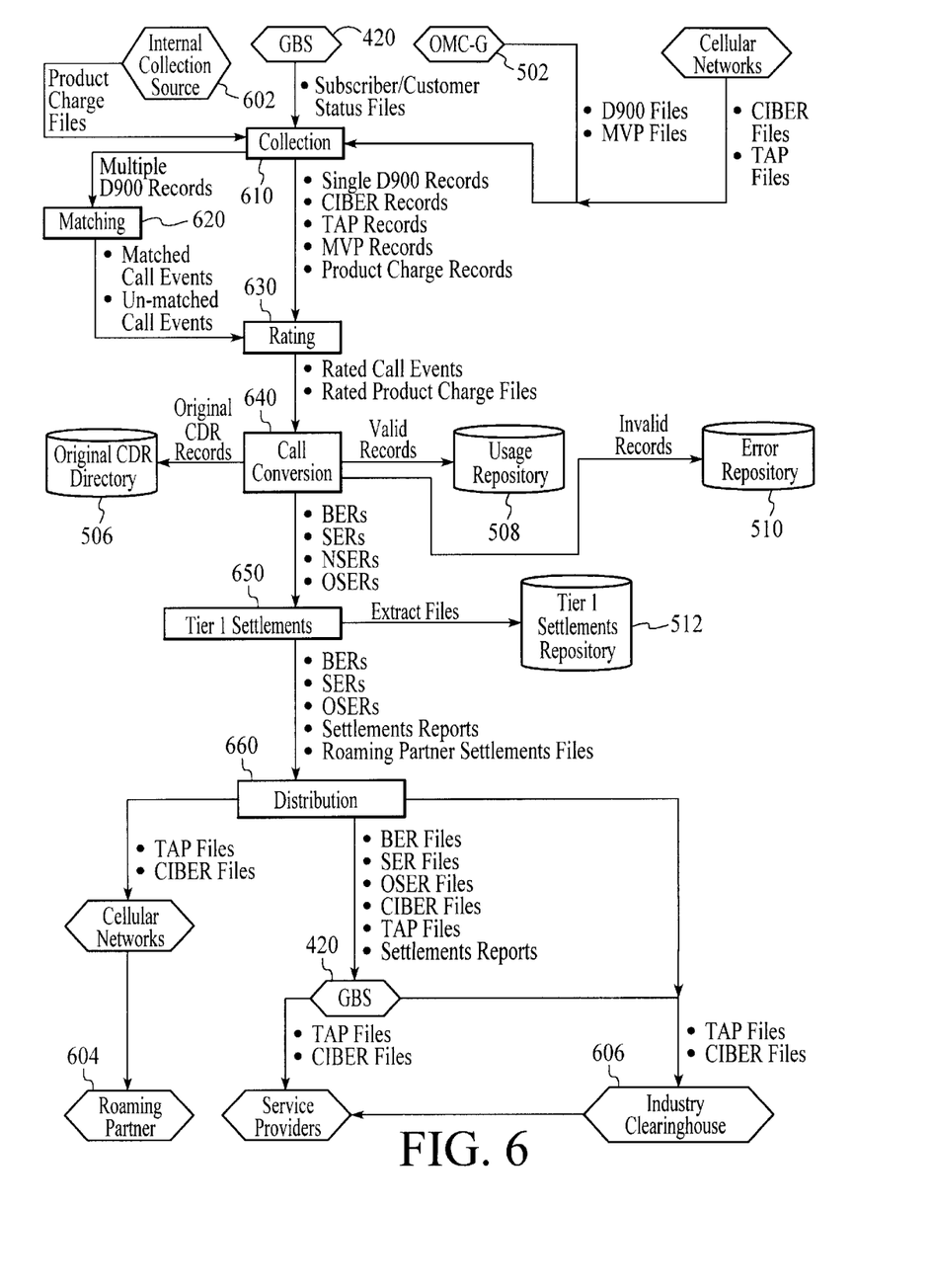
FIG. 6 is a flow chart which illustrates the pathway processes of the business system of FIG. 4.

FIG. 5 illustrates in more detail the processes of the business subsystems of the preferred embodiment of the business system 400 in the usage management of the telecommunications network 100, including the BSS 430. FIG. 6 is a flow chart illustrating the pathway processes 504 of the BSS 430.

The BSS 430 processes begin with the Collection Process, via step 610. Each time a call is made through the network 100, a record of the call event, called a Call Detail Record (CDR) is created in the gateway 110 in the Operations Maintenance Controller-Gateway 502 (OMC-G). These records could be in any number of formats, such as Siemens D900 (D900), Cellular Intercarrier Billing Exchange Roamer (CIBER), Transfer Account Protocol (TAP), and Modular Voice Processing (MVP). The D900 files contain voice records; the MVP files contain messaging records; and the CIBER and TAP files contain roaming partner billing exchange records. The OMC-G 502 notifies the BSS 430 when files containing CDRs in the D900 format are ready for collection. These files are then collected from the OMC-G 502 by the BSS 430. Files containing CDRs in the CIBER and TAP formats are received by the GBS 420. The Collection Process then collects the CIBER and TAP files from the GBS 420. The Collection Process also collects Subscriber and Customer Status files from the GBS 420. These records contain subscriber and cellular customer information, such as activation, deactivation, and service changes. Lastly, the Collection Process collects Product Change files from an internal source 602. These files contain monthly and one-time charge records. The Collection Process then performs a series of validations on the collected files to ensure that the files are complete and properly formatted with industry-standard information, that subsequent BSS processes receive usable information, and that the BSS system integrity is maintained. Once the files have passed validations, the Collection Process converts the CDRs in the D900, MVP, CIBER, TAP, and product charge files into a standard format required for subsequent BSS processing.

Sometimes, multiple CDRs are generated for a single call, called multiple records calls. From the Collection Process, the CDRs in D900 files that are not part of a multiple record call are sent directly to the Rating Process. Those that are part of a multiple record call is first sent to the Matching Process, via step 620, where they are matched with other CDRs in the call. These CDRs are then combined into a single call event and then sent to the Rating Process.

The Rating Process, via step 630, first performs record-level validations. The validation ensures that the files are complete and properly formatted. This pre-processing step ensures that the CDRs, and the information they contain, are valid and comply with industry standards. It then translates this input into an industry standard format called Data Message Handling (DMH). The Rating Process then determines which DMH formatted call events are ratable and which call events are not ratable. A call events is "ratable" if it can be subjected to a rate model or pricing adjustment. For all that are ratable, the Rating Process applies the appropriate pricing model, pricing adjustments, and taxes to determine total charges. The total call revenue is allocated between all entities (service providers, gateway operators, roaming partners, government agencies, etc.) involved in the call event, as each entity receives a portion of the total call revenue. The outputs of the Rating Process are rated call events and rated product charge files which are sent to the Call Conversion Process.

The Call Conversion Process of the present invention, via step 640, prepares rated call events sent from the Rating Process for storage and distribution. The Call Conversion Process converts the rated call events into formats readable by subsequent repositories, or storage areas for call events, and processes. The Call Conversion Process creates valid records for any rated call events that do not contain errors. Valid records are then loaded in the Usage Repository 508. Invalid records are created for any rated call events that contain errors and stored in the Error Repository 508. The original CDRs are assembled into files for loading into a directory 506 separate from the Usage Repository 508. The original CDRs are important because they serve as a complete record of the original data as it was received from the gateway 110. Rated call events that do not contain errors are converted to different types of event records, such as Billing Event Records (BER), Settlement Event Records (SER), Net Settlement Event Records (NSER), and Outcollect Settlement Event Records (OSER). The purpose of a BER is to bill a subscriber for using the network 100. BERs are sent to the home gateway of a chargeable subscriber. The purpose of a SER is to notify gateways 110 of their settlement roles in a call, but not to bill a subscriber. SERs are sent to all gateways 110 involved in the handling of the call, excluding the home gateway. NSERs contain a summary of all charge information associated with a particular call. NSERs are sent to the Tier 1 Settlements Repository 512. OSERs contain call activity and charge information for calls in which the customer of a roaming partner is the chargeable party. OSERs are sent to the gateway 110 associated with the roaming partner whose customer made a call.

The Tier I Settlements Process, via step 650, receives NSERs from the Call Conversion process and translates them into data suitable for loading into the Tier 1 Settlements Repository 512. This data takes the form of extract files, which contain important financial and usage information necessary for reporting purposes. These files are held in temporary storage for later release to the Distribution Process. In addition to creating extract files, the Tier I Settlements Process also creates settlement reports and releases them to the GBS 420 and the Clearinghouse. There are three types of settlement reports: financial reports, usage reports, and operational reports. Financial reports capture daily and month to date financial activity of entities involved in the calls. Usage reports capture the monthly system activity for each gateway 110. Operational reports capture information pertaining to BSS processing, such as collection and distribution, audit, error, reject management, rate package, and roaming agreement information. These reports are released to the Distribution Process where they will be grouped according to their destination point and distributed.

The Distribution Process of the present invention, via step 660, receives BER files, SER files, OSER files, and settlements reports from the Tier I Settlements Process, and sends them to their final destinations: the GBS 420, roaming partners 604, and industry clearinghouses 606. The Distribution Process first groups and formats the files according to their type and destination. Once grouped, the BER, SER, and roaming partner settlement files, and settlement reports are ready for final distribution. However, OSER files require conversion into TAP and CIBER files before it is ready for distribution. The BER files are distributed to the home gateway of a subscriber. The SER files are distributed to a gateway 110 involved in the handling of a portion of a call, excluding the home gateway. The original OSER files are distributed to a gateway 110 involved in handling a portion of a call in which a roaming, non-system customer is the chargeable party. The TAP and CIBER files converted from the original OSER files are then distributed to roaming partners and industry clearinghouses. Roaming partner settlement files are distributed to gateways or directly to a roaming partner or industry clearinghouse. These files contain charges payable to roaming partners or receivable from roaming partners, and is used by gateways 110 to perform Tier II settlements processing and reporting, as described later. Settlement reports are distributed to all gateways 110 and the Clearinghouse. The Distribution Process of the present invention will be described in more detail later.

The Collection, Matching, Rating, Call Conversion, and Settlements Processes are disclosed, respectively, co-pending U.S. Patent Applications entitled, "A Billing Records Collection Process for a Business System for a Global Telecommunications Network," Ser. No. 09/158,086, filed on Sep. 22, 1998; "A Matching Process for a Business System for a Global Telecommunications Network," Ser. No. 09/157,826, filed on Sep. 21, 1998; "A Call Rating Process for a Business System for a Global Telecommunications Network," Ser. No. 09/158,172, filed on Sep. 21, 1998; "A Call Conversion Process for a Business System for a Global Telecommunications Network," Ser. No. 09/157,656, filed on Sep. 22, 1998; and "A Settlements Process for a Business System for a Global Telecommunications Network," Ser. No. 09/158,724, filed on Sep. 22, 1998. Applicant hereby incorporates the above-mentioned Patent Applications by reference.

In addition to the processes described above, the preferred embodiment of the BSS 430 also includes five BSS applications which may be accessed by Clearinghouse personnel. These include Audits and Controls, Usage Inquiry, Error Administration, Reject Management, and Table Maintenance. Each of these applications has a Graphical User Interface (GUI) that provides Clearinghouse personnel the ability to track errors, view usage information, and update reference tables in the system. Information from these interfaces is provided to gateways 110 via operational reports.

The purpose of the Audits and Controls application is to track information as it flows through the processing steps described above. This application allows Clearinghouse personnel to monitor the status of files as they move through the BSS 430.

The Usage Inquiry GUI allows access to information contained in the Usage Repository 508. This Usage Inquiry application allows Clearinghouse personnel to view original D900, CIBER, TAP, and MVP records, charge information associated with a particular call, or product charge information.

The Error Administration application allows Clearinghouse personnel to track and troubleshoot records that have erred out of the processing path. The application searches for erred records that are located in the Error Repository 510 and displays this information in varying levels of detail. This application is also used to respond to trouble notification generated by an error threshold monitoring process. This error threshold monitoring process examines the contents of the Error Repository 510 and compares the error volumes and potential revenue loss to defined pre-determined thresholds. If a threshold is exceeded, a trouble ticket is opened in the Maintenance Ticket Tracking System 514 (MTTS) and stored in the Trouble Ticket Repository 516. Clearinghouse personnel can then access Error Administration to reduce the level of errors associated with the trouble ticket.

The Reject Management application accesses any records or files which do not pass validation. This application allows Clearinghouse personnel to view, reject, and recycle these records or files. It also allows for the tracking and verification of the accuracy of all records coming into the system from roaming partners and industry clearinghouses.

The Table Maintenance application allows Clearinghouse personnel to input and update reference information contained in tables used by the normal processes. It also provides an audit trail so that the history of each table update is recorded.

The BER, SER, and original OSER files and settlement reports resulting from the Distribution Process of the BSS 430 are collected by the GBS 420. These files are then processed by the Billing System and Control System 518 (BSCS). The BSCS 518 first converts the BER and SER files into the Data Message Handler (DMH) format, or Interim Standard 124 (IS124). With files in this format, the BSCS 518 performs wholesale and retail billing. Conversion of the files into the DMH format before billing allows the billing to be done more easily. This billing process rates the call events, taking into account the countries involved in the call, the tax laws of these countries, the currencies of these countries, and the languages of these countries. The result of the wholesale and retail billing performed by the BSCS 518 is files in the TAP format. The billings for direct network customers 532 (retail billing) are forwarded to the DOC1 process 520, which creates invoices which are then sent to the customers. For the billings for service providers 530 (wholesale billing), some service providers require billings in the TAP formats while others require them in the CIBER format. Those that require them in the TAP format receive the billings directly from the BSCS 518. Those that require them in the CIBER format have their billings first sent to the conversion engine, ACE 522, which converts these billings into the CIBER format. They are then sent to the service providers of the SBS 410. In addition to billing, the BSCS 518 also performs Tier II Settlement where the appropriate settlement reports are send to the correct entities, be it service providers, roaming partners, or some other entity. With SPNet 524, service providers may use their existing systems and still provide the network's 100 services. This eliminates the need for service provides to have hardware and software specifically designed to work with the network 100.

When a service provider of the SBS 410 sells network services to a customer, the service provider may activate that customer's account through the Service Provider Net (SPNet) system 524. The SPNet 524 is a personal computer with software to access to the internet. Through the internet, the service provide can access an account software, called QA Partner, and enter all the information required for the activation of the customer's account. The QAPartner then sends the information to the BSCS 518. The SPNet 524 may also be used to input problems experiences by the customer which is input into the MTTS 526 on the GBS 420. The MTTS 526 functions similar to the MTTS 514 of the BSS 430.

The BSCS 518 stores a copy of this information in its Customer Data Repository 528. Once received, the BSCS 518 sends the information to the switch 310 of the gateway 110 which would be the customer's Home Gateway and activates the network elements for service to this customer. The switch 310 sends back to the BSCS 518 a confirmation of receipt of the information. Once the BSCS 518 receives confirmation, it notifies the BSS 430 of the activation so that when it receives CDRs for this customer, it will recognize it as a valid record.

Geolocation

In order to provide the above services, the location of the subscriber equipment (cellular phone 130, pager 135, etc.) with respect to the satellites 105, as well as the LAC in which the subscriber resides must be determined. As discussed with respect to FIG. 2, above, each satellite 105 has a footprint 210 containing cells 220. Thus, the information used by the satellite 105 and the network 100 is based on the geometry such as cells 220 and footprints 210. The cells 220 can be thought of as a grid superimposed on and fixed with respect to the earth. However, the cells 220 in the grid do not take into account geographic features of the earth. For example, the globe is also divided into LACs. The LAC may be based on a variety of geographic features. For example, the LACs serviced by a particular gateway 110 may be defined to fall within a particular country. The LACs may also be defined to ensure that signals can adequately be provided to subscribers with the LAC. Thus, the LACs may be defined so that two LACs border a mountain range. LACs can also be gathered into a group, called a service control area (SCA). An SCA includes LACs within a particular geopolitical region. Thus, an SCA includes LACs sharing the same country. Based on the identity of the LACs or SCAs serviced, various aspects of a call can be determined. For example, using the Home gateway of the cellular phone 130 and the country of the destination LAC for a call, it can be determined whether a call to a particular LAC can proceed. The billing and tariff information for the country of the destination LAC can also be determined. Thus, the LACs and SCAs are to be linked to the geometry, including the cells 220 of the network 100.

The present invention provides a method and system for managing an interaction with a user of a telecommunications network. The telecommunications network utilizes data relating to a geometry of the network. The method and system comprise identifying a plurality of geographic regions and correlating the geometry with plurality of geographic regions. Thus, data relating to the geographic regions can be used in the telecommunications network.

The present invention will be described in terms of a particular network using particular equipment and providing particular services. However, one of ordinary skill in the art will readily recognize that this method and system will operate effectively for other types of networks, other equipment, and other services. The method and system in accordance with the present invention provide particular utility when correlation of geometry and geography is desired.

A method and system for determining the spatial overlap of LACs and messaging cells is disclosed in co-pending U.S. patent application Ser. No. 09/158,724 entitled "METHOD AND SYSTEM FOR PROVIDING SERVICES TO USERS OF A GLOBAL TELECOMUNICATIONS NETWORK" filed on Sep. 22, 1998 and assigned to the assignee of the present application. Applicant hereby incorporates by reference the above-mentioned co-pending application.

Figure 7:
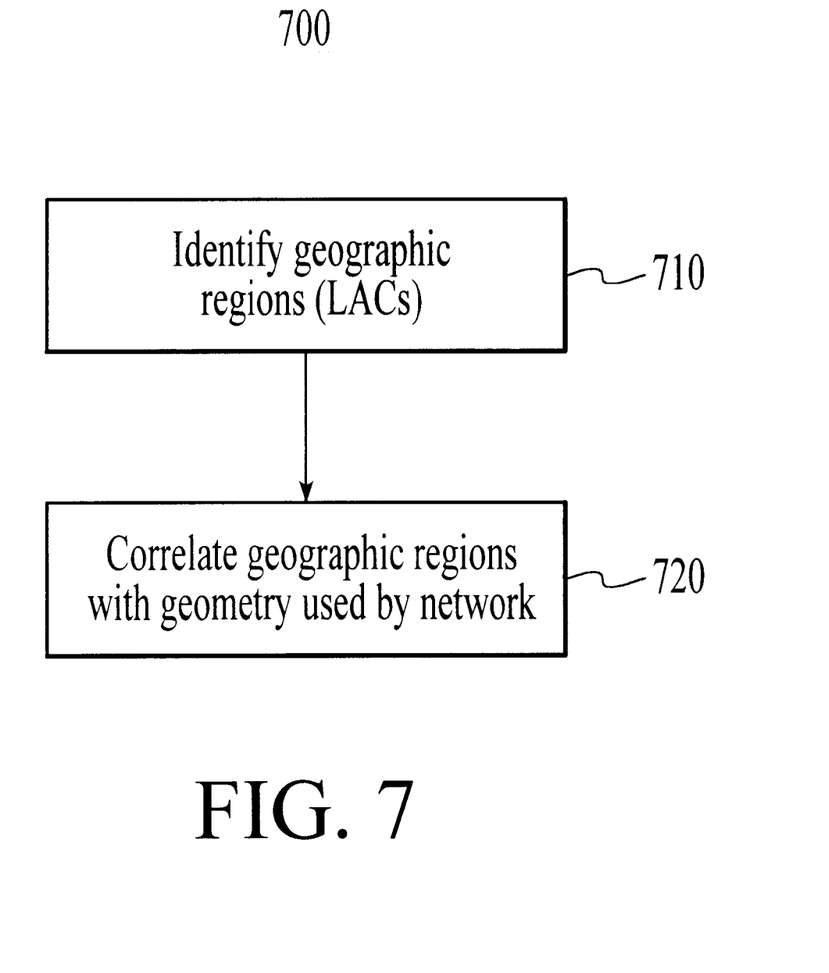
FIG. 7 is a flow chart depicting a method in accordance with the present invention.

To more particularly illustrate the method and system in accordance with the present invention, refer now to FIG. 7, depicting a flow chart of a method 700 in accordance with the present invention. The geographic regions are identified, via step 710. In a preferred embodiment, step 710 includes identifying each of the plurality of LACs and the SCAs which will be used by the network 100. In a preferred embodiment, therefore, the geographic regions include LACs and/or SCAs. In a preferred embodiment, step 710 also includes generating a map indicating each of the LACs and SCAs. The map can be utilized by a computer system which will provide information to the network 100. In a preferred embodiment, the map can be provided using conventional geographic software. The geographic regions are then correlated with the geometry of the network 100, via step 720. In step 720, the geographic regions are correlated with the geometry so that the network 100 can utilize the information to manage services to users. In a preferred embodiment, step 720 includes correlating LACs and/or SCAs with cells 220. Also in a preferred embodiment, step 720 includes generating a table correlating the cells 220 with LACs and/or the SCAs. The table can be used by the network 100 to manage services provided to a user. The table is preferably an ASCII file, which can be converted to a binary format. The binary file is used by the network 100 to manage services to a user.

Figure 8:
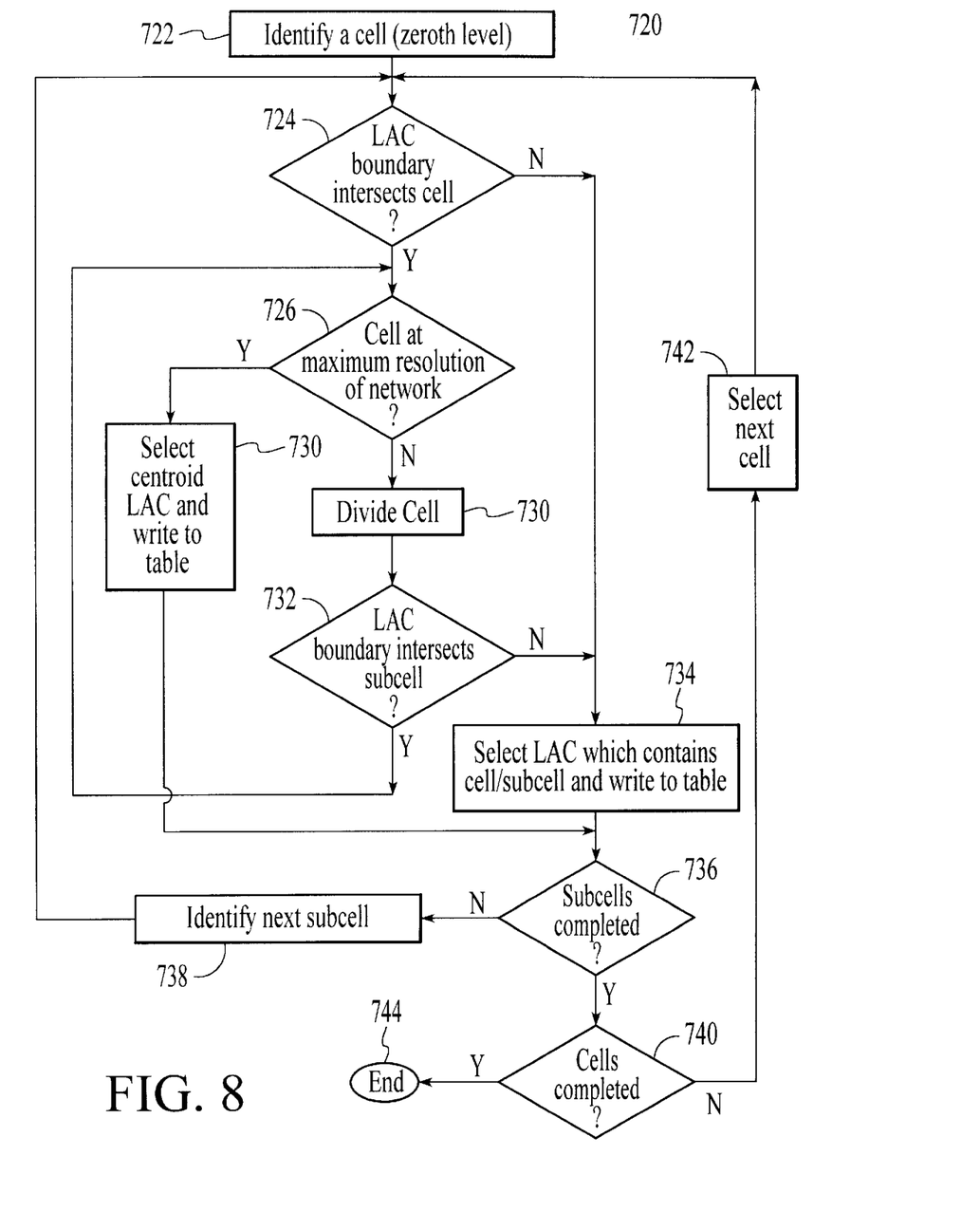
FIG. 8 is a flow chart of a more detailed method for correlating geographic regions with the geometry of the telecommunications network in accordance with the present invention.

FIG. 8 depicts a more detailed flow chart of the step 720, correlating geographic regions with the geometry of the network 100. A cell 220 is identified, via step 722. The cell 220 is one of a number of cells which form a grid over the earth. In a preferred embodiment, the cell 220 identified in step 722 is a zeroth level cell. The zeroth level cell is not at the highest spatial resolution allowed in the network 100. In a preferred embodiment, the zeroth level cell is on the order of sixty-four kilometers by sixty-four kilometers. Also in the preferred embodiment, the spatial resolution is approximately four kilometers. Although cells 220 depicted in FIG. 2 have the same size, in a preferred embodiment of the network 100, cells 220 include cells 220 and subcells 220. The cells 220 and subcells 220 can have a plurality of sizes. In one embodiment, each cell is provided with a unique identifier. Thus, step 724 is performed by associated the cell with a unique identifier. In a preferred embodiment, the identifier is a grid identifier based on a latitude and longitude. This identifier is what is used by the network 100 to identify the cell 220.

It is then determined if a boundary of an LAC intersects the current cell 220, via step 724. If a boundary of an LAC does not intersect the current cell 220, then the cell 220 is contained in an LAC. Thus, the LAC which contains the cell 220 is correlated with the cell 220, via step 734. In a preferred embodiment, step 734 includes identifying the LAC containing the cell 220 and writing the identities of the LAC and the cell 220 to a table. Thus, in a preferred embodiment step 734 includes writing the identifier of the cell 220 and an identifier for the LAC into the table. Also in a preferred embodiment, step 734 also includes writing the identity of the SCA containing the LAC in the table. Step 734 also preferably includes choosing whether or not to set a flag for the cell 220 in the table. If the flag is set, then the cell 220 will contain subcells. If the flag is not set, then the cell 220 is not intersected by a boundary of an LAC and the cell 220 does not contain subcells.

If it is determined in step 724 that the boundary of an LAC intersects the cell 220, then it is determined whether the cell 220 is at the maximum resolution of the network 100, via step 726. In a preferred embodiment, the maximum resolution is a cell 220 approximately four kilometers by four kilometers. If the cell 220 is at the maximum resolution, then the LAC which covers the largest portion of the cell 220 (centroid LAC) is correlated with the cell 220, via step 728. In a preferred embodiment, step 728 includes not only identifying the centroid LAC, but also writing the identities of the cell 220 and the centroid LAC to a table. Thus, step 728 includes writing the identifier for the cell 220 and an identifier for the LAC into the table. Also in a preferred embodiment, step 728 includes writing the SCA containing the centroid LAC to the table.

If it is determined that the cell 220 is not at the maximum resolution of the network 100, then the cell 220 is divided, via step 730. In a preferred embodiment, the cell 220 is bisected into subcells 220, via step 730. Consequently, step 730 may be carried out five times from the zeroth level cell 220 to reach the maximum resolution of the network 100. It is then determined if a boundary of an LAC intersects the subcell 220, via step 732. If a boundary of an LAC does not intersect the subcell 220, then the LAC containing the subcell 220 is correlated with the subcell 220, via step 734. In a preferred embodiment, step 734 includes identifying the LAC containing the (sub)cell 220 and writing the identities of the (sub)cell 220 and the LAC to a table. Also in a preferred embodiment, step 734 includes writing the SCA containing the LAC in the table. Step 734 also preferably includes choosing whether or not to set a flag for the cell 220 in the table. If the flag is set, then the cell 220 will contain subcells. If the flag is not set, then the cell 220 is not intersected by a boundary of an LAC and the cell 220 does not contain subcells. If a boundary of an LAC intersects the subcell 220, then step 726 is returned to. Thus, the process of determining if a boundary of an LAC intersects a cell 220 and correlating the appropriate LAC with the cell 220 or subcell 220 continues until either the maximum resolution of the network 100 is reached or until a cell 220 is contained completely within an LAC.

Once either step 728 or step 734 is performed, it is determined whether all of the subcells 220 for a particular zeroth cell 220 have been correlated with LACs, via step 736. If not all subcells 220 have been treated in the method 720, then the next subcell 220 is identified, via step 738. The method then returns to step 724 and the process repeats for that subcell 220. If all of the subcells 220 have been correlated with LACs, it is determined whether all of the cells 220 for the network 100 have been correlated with LACs, via step 740. If not, then the zeroth cell 220 is identified, via step 742. The method then returns to step 724 and the process repeats for that cell 220. If all of the cells 220 have been correlated with LACs which either contain the cell 220 or are centroids of the cell 220, then the method terminates, via step 744.

Figure 9:
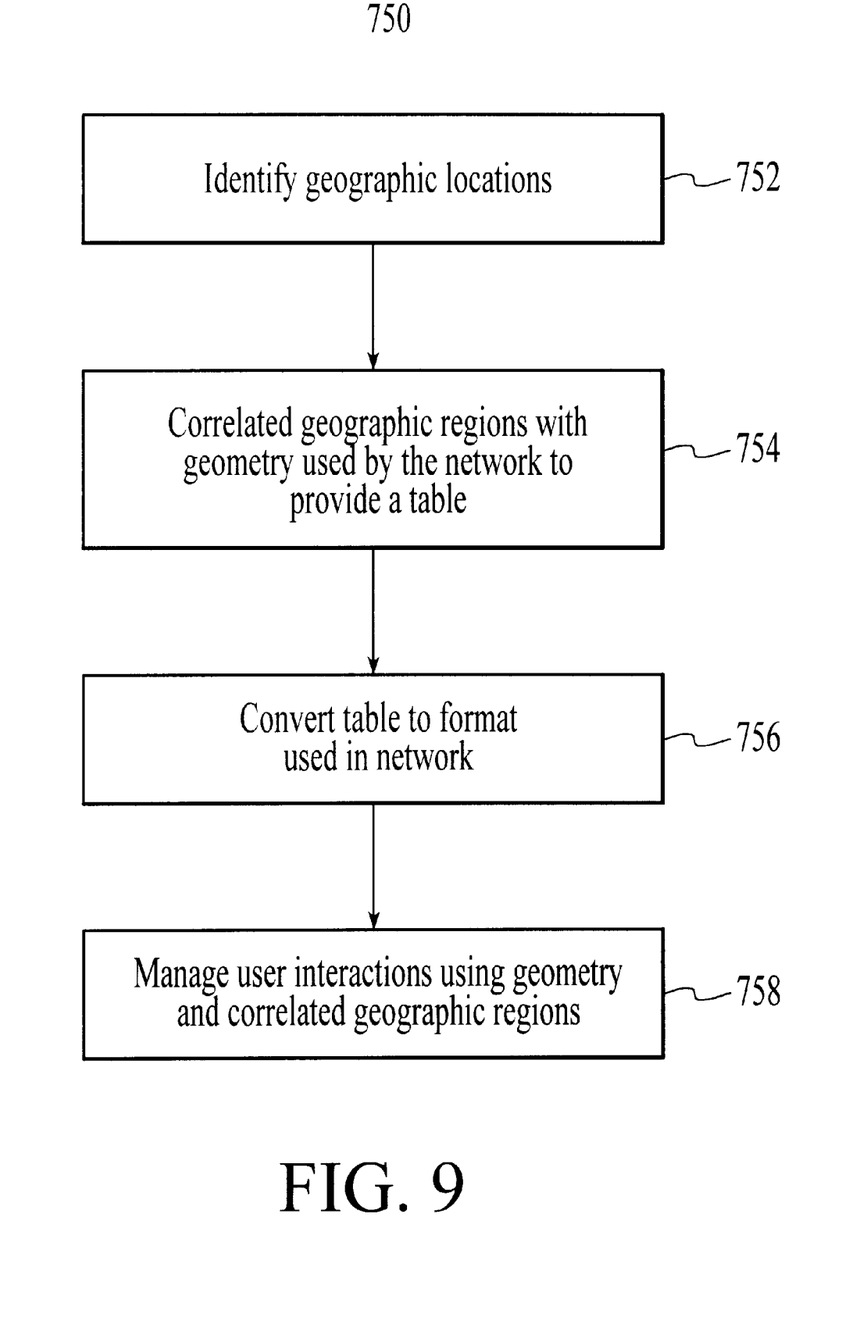
FIG. 9 is a flow chart depicting a method for managing a user's interaction with a telecommunications network in accordance with the present invention.

FIG. 9 depicts a high level flow chart of a method 750 for managing interactions in accordance with the present invention. The geographic regions are identified, via step 752. Thus, step 752 is analogous to step 710 of the method 700. The geographic regions are then correlated with the geometry of the network 100, via step 754. Step 754 is analogous to step 720. Consequently, the resultant of step 754 is preferably a table which lists each cell 220, or subcell 220, the LAC which is correlated with it, and the SCA in which the LAC is grouped. The table is then converted into a format which can be directly used by the network 100, via step 756. In a preferred embodiment, step 756 includes converting the table into a binary object which can be used by various portions of the network 100 to identify the cell 220, the LAC correlated with the cell 220, and the SCA containing the LAC. In a preferred embodiment, the conversion of the table utilizes the flag set in step 734 to ensure that data is provided in the correct order. In a preferred embodiment, data for all cells and subcells is contained together. If the flag is set, then data for a cell 220 and its subcells 220 are accessed and written to the binary object in order, from zeroth level cell 220 to smallest subcell 220. Then, data for the next cell 220 will be accessed from the table and written to the binary object. The network 100 then utilizes the geometry and geography information to manage interactions with a user, via step 758. In a preferred embodiment, step 758 includes but is not limited to determining if a particular call can be placed to a particular LAC, and determining billing information.

Thus, the geometry of the network 100 has been correlated to geography. Because this correlation has been provided, laws, tariffs, and other sovereignty issues for individual geopolitical entities can be taken into account by the network 100. Geographic features, such as mountain ranges, can also be taken into account by the network 100. Although the network 100 utilizes a geometry which would not otherwise be correlated to geographic features, the network 100 can be used to provide global telecommunications services to users.

A method and system has been disclosed for managing user interactions using geographic and geometry information. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing an interaction with a user of telecommunications network, the telecommunications network utilizing data relating to a geometry of the network, wherein the geometry of the network further includes a plurality of cells, wherein each of the plurality of geographic regions includes a boundary, wherein the telecommunication network further has a maximum spatial resolution, the method comprising the steps of:

(a) identifying a plurality of geographic regions; and
(b) correlating the geometry with plurality of geographic regions, wherein the correlating step (b) further includes the steps of:
  (b1) identifying a cell of the plurality of cells;
  (b2) determining if the cell includes the boundary;
  (b3) associating the cell with a geographic region intersecting the cell if the cell does not include the boundary;
  (b4) dividing the cell into a plurality of subcells if the cell includes the boundary;
  (b5) associating the cell with the geographic region intersecting the cell and occupying a largest portion of the cell if the cell includes a boundary and the telecommunications network is at the maximum resolution; and
  (b6) repeating steps (b1) through (b4) for each of the plurality of subcells wherein data relating to the plurality of geographic regions can be used by the telecommunications network.

2. The method of claim 1 wherein the correlating step (b) further includes the steps of:
  (b7) repeating steps (b1) through (b6) for each of the plurality of cells.

3. The method of claim 2 wherein a service requested by the user is associated with a first geographic region of the plurality of geographic regions and wherein the method further includes the step of:
  (c) managing the interaction based on the first geographic region.

4. A computer-readable medium having a program managing an interaction with a user of a telecommunications network, the telecommunications network utilizing data relating to a geometry of the network, wherein the geometry of the network further includes a plurality of cells, wherein each of the plurality of geographic regions includes a boundary, the program including instructions for:
  identifying a plurality of geographic regions, the user in a first geographic region of the plurality of geographic regions; and
  correlating the geometry with plurality of geographic regions, wherein the instructions for correlating the geometry with the plurality of geographic regions further includes instructions for:
    identifying a cell of the plurality of cells;
    determining if the cell includes the boundary;
    dividing the cell into a plurality of subcells if the cell includes the boundary;
    associating the cell with a geographic region intersecting the cell if the cell does not include the boundary; and
    repeating the cell identifying, cell determining, cell dividing, and cell associating instructions for each of the plurality of subcells and for each of the plurality of cells;
  wherein data relating to the plurality of geographic regions can be used by the telecommunications network.

* * * * *